(12) United States Patent
Jung

(10) Patent No.: US 7,686,142 B2
(45) Date of Patent: Mar. 30, 2010

(54) BRAKE PLATE

(75) Inventor: Friedrich Jung, Waldbrunn-Ellar (DE)

(73) Assignee: AML Lanxide Europe GmbH, Meckenheim (DE)

( * ) Notice: Subject to any disclaimer, the term of this patent is extended or adjusted under 35 U.S.C. 154(b) by 277 days.

(21) Appl. No.: 11/161,240

(22) Filed: Jul. 27, 2005

(65) Prior Publication Data

US 2006/0180414 A1  Aug. 17, 2006

(30) Foreign Application Priority Data

Feb. 11, 2005  (DE) .................. 10 2005 006 569

(51) Int. Cl.
*F16D 69/00* (2006.01)
*F16D 65/14* (2006.01)
(52) U.S. Cl. .................. 188/250 B; 188/250 G; 188/250 F
(58) Field of Classification Search .......... 188/250 B, 188/250 F, 250 G, 258, 73.1, 218 XL
See application file for complete search history.

(56) References Cited

U.S. PATENT DOCUMENTS

| | | | |
|---|---|---|---|
| 649,762 A | 5/1900 | Saltzkorn et al. | |
| 1,044,283 A | 11/1912 | Stanger | |
| 3,557,407 A | 1/1971 | Lemelson | |
| 4,005,991 A | 2/1977 | Uebayaskl et al. | |
| 4,569,424 A | 2/1986 | Taylor, Jr. | |
| 4,799,579 A * | 1/1989 | Myers et al. ............. | 192/107 M |
| 5,376,410 A | 12/1994 | Mackelvie | |
| 6,279,222 B1 * | 8/2001 | Bunker et al. ............... | 29/527.5 |
| 6,367,600 B1 * | 4/2002 | Arbesman ............... | 188/250 G |
| 6,431,331 B1 | 8/2002 | Arbesman | |
| 6,464,047 B1 | 10/2002 | Arbesman | |
| 6,488,131 B2 * | 12/2002 | Hayford .................. | 188/73.39 |
| 6,843,095 B2 | 1/2005 | Arbesman | |
| 6,910,255 B2 | 6/2005 | Arbesman | |
| 2003/0213658 A1 * | 11/2003 | Baba ...................... | 188/73.37 |
| 2004/0016608 A1 * | 1/2004 | Gutowski .................. | 188/73.1 |
| 2004/0140165 A1 * | 7/2004 | Pham .................. | 188/218 XL |
| 2004/0238295 A1 * | 12/2004 | Pham ........................ | 188/73.1 |
| 2005/0139439 A1 * | 6/2005 | Kulis et al. ............. | 188/250 B |

FOREIGN PATENT DOCUMENTS

| | | |
|---|---|---|
| CA | 263871 | 8/1926 |
| CA | 311275 | 5/1931 |
| CA | 1330521 | 7/1994 |

(Continued)

*Primary Examiner*—Bradley T King
*Assistant Examiner*—Thomas Irvin
(74) *Attorney, Agent, or Firm*—Connolly Bove Lodge & Hutz LLP

(57) ABSTRACT

The invention relates to a brake lining carrier plate 1 to hold a friction lining, especially for installation into a vehicle brake system, with holding structures 15, 16 for the friction lining arranged in rows 6 on the lining side 2, whereby each holding structure 15, 16 has a protrusion 3 and a depression 4, whereby the protrusion 3 is made when the depression 4 is formed in the surface 5 through the displacement of material. Said protrusion 3 engages with the friction lining. The holding structures 15, 16 in the rows 6 are arranged in such a way that there is a protrusion 10 at the beginning 8 and at the end 9 of each row 6. In one embodiment, the rows 6 run essentially crosswise to the longitudinal axis 7 of the brake lining carrier plate 1.

25 Claims, 10 Drawing Sheets

FOREIGN PATENT DOCUMENTS

| | | |
|---|---|---|
| CA | 1337622 | 11/1995 |
| DE | 103 26 962 B3 | 11/2004 |
| DE | 103 47 409 A1 | 5/2005 |
| EP | 1 484 524 A1 | 12/2004 |
| GB | 2 245 667 A | 8/1992 |
| WO | WO-00/49308 | 8/2000 |
| WO | WO-03/081075 A1 | 10/2003 |

* cited by examiner

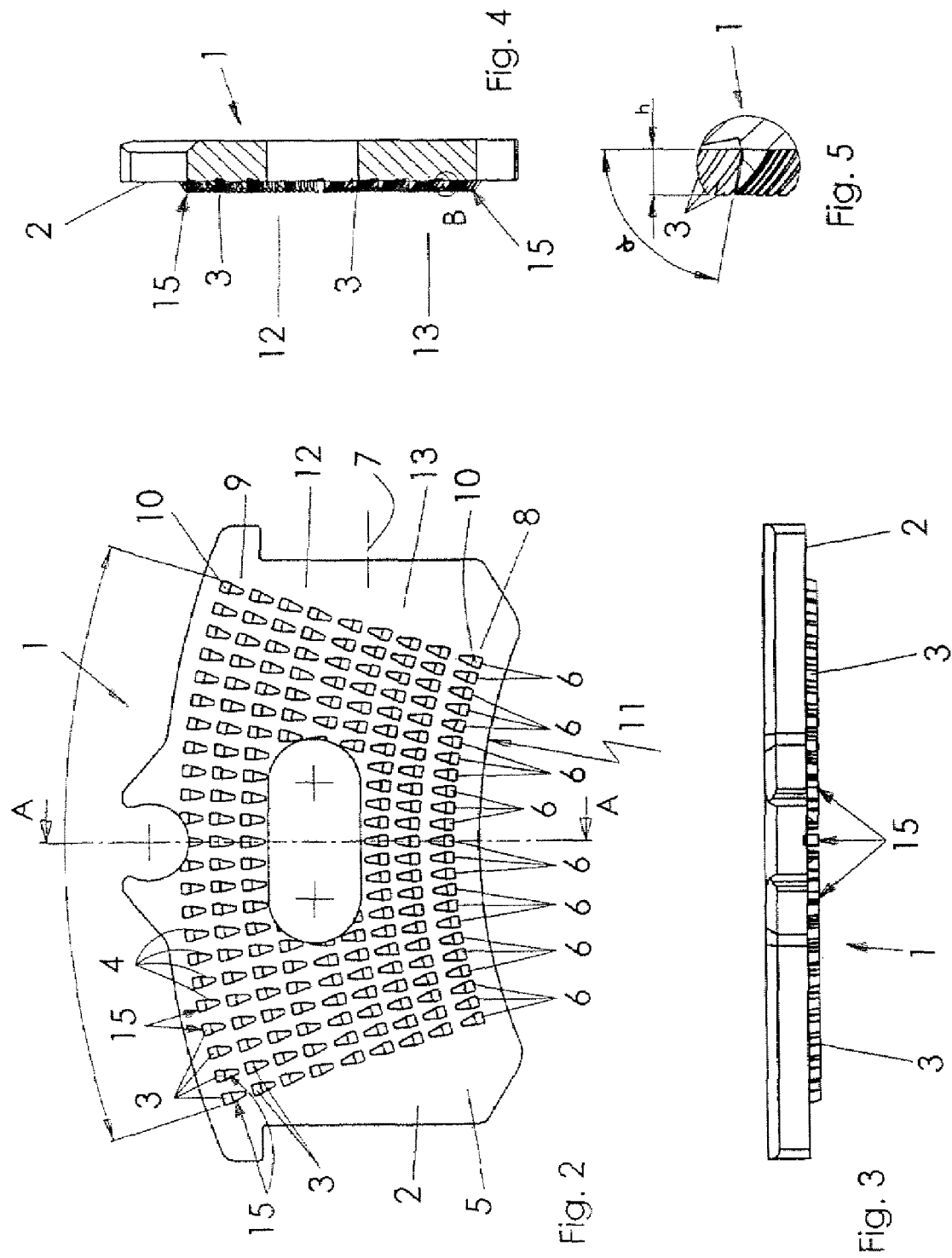

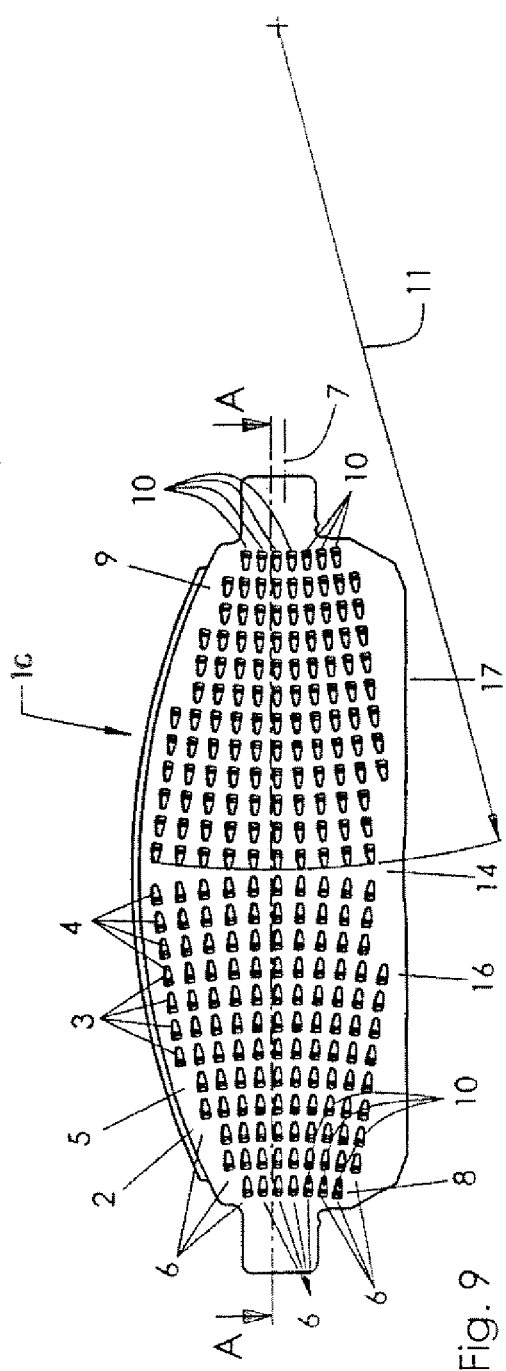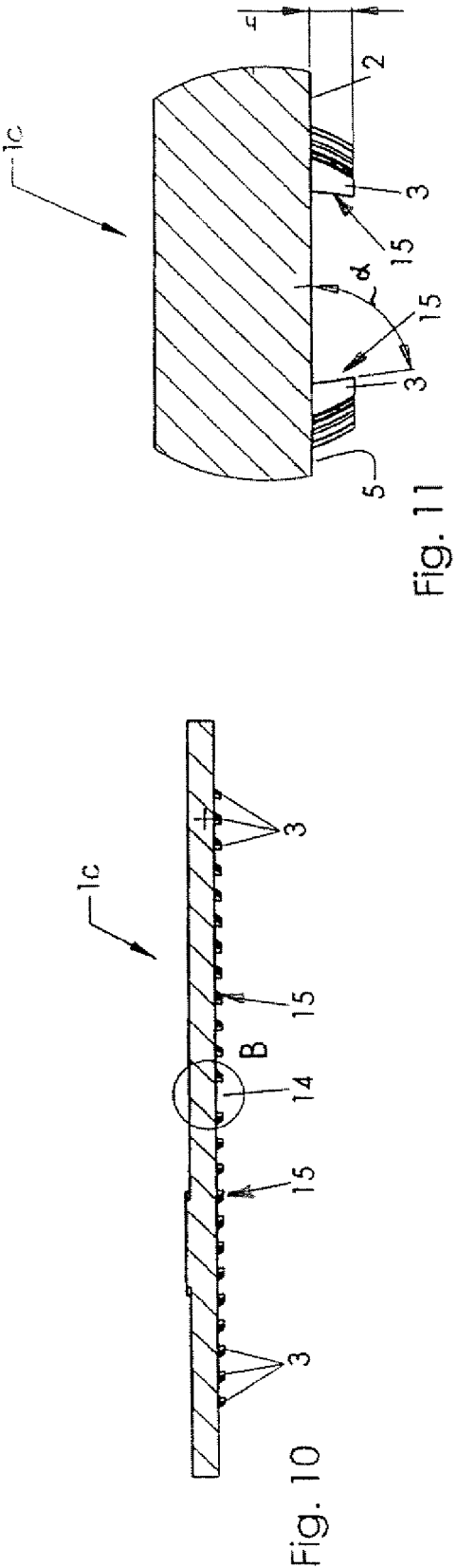
Fig. 9
Fig. 10
Fig. 11

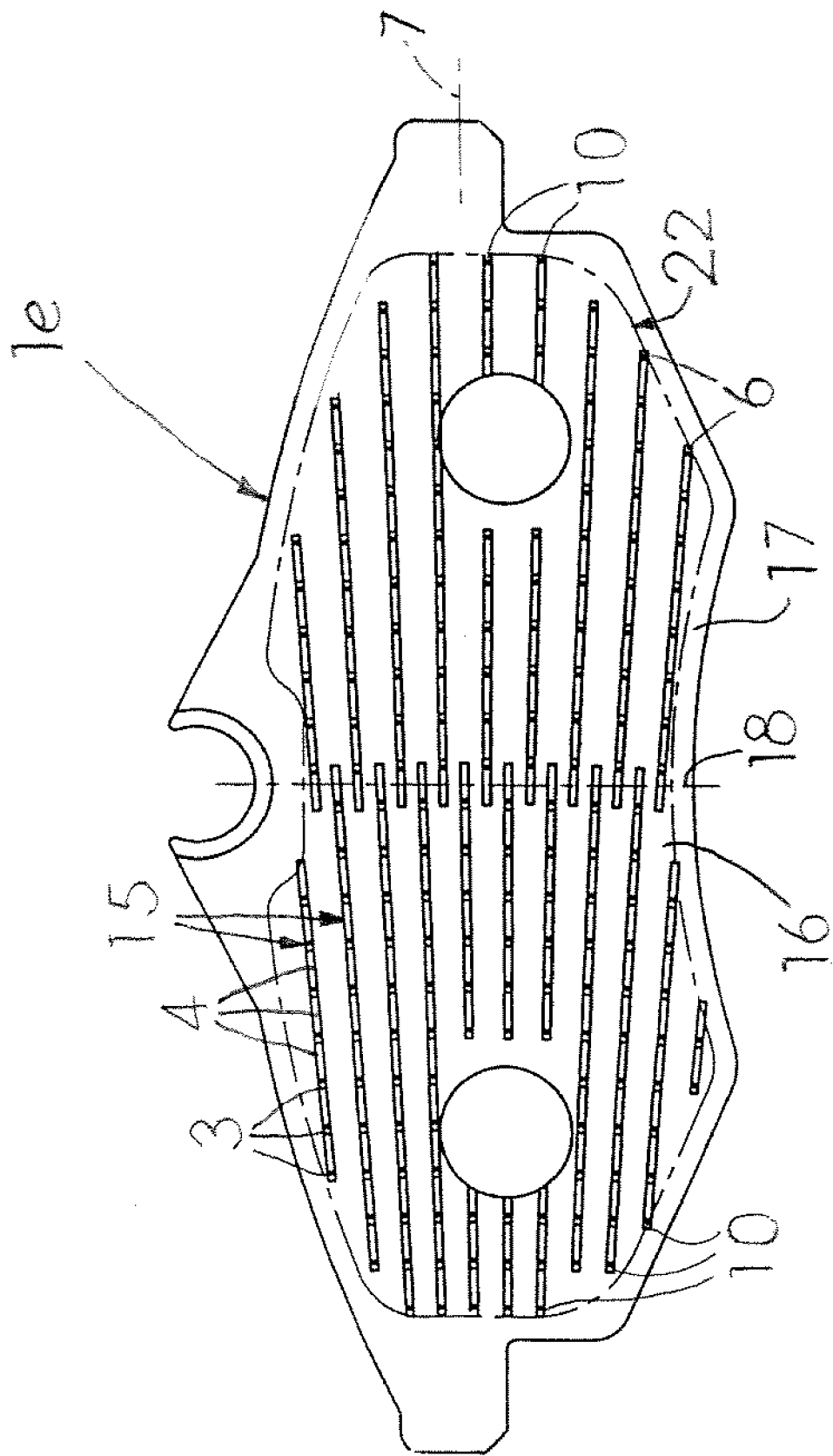

BRAKE PLATE

The invention relates to a brake lining carrier plate to hold a friction lining, especially for installation into a vehicle brake system. The brake lining carrier plate has holding structures for the friction lining arranged in rows on the lining side, whereby each holding structure has a depression and a protrusion, the protrusion being made when the depression is formed in the surface through the displacement of material. Said protrusions engage with the friction lining.

TECHNICAL BACKGROUND

Brake lining carrier plates entail the risk that so-called edge lifting of the friction lining occurs on the brake lining carrier plate, which can cause the friction lining to shear off from the brake lining carrier plate when subjected to high braking torques. Edge lifting refers to the separation of the friction lining at its outer contour or in the area of its edges from the brake lining carrier plate. Such edge lifting may be caused by the penetration of moisture, water, salt water, and the like, into this outer contour or edge area. Edge lifting also possibly may be caused by rusting of the brake lining carrier plate brought about by said moisture penetration.

With the known brake lining carrier plates, edge lifting is facilitated primarily by the depressions in the holding structures that are present in the edge area on the brake lining carrier plate as a result of the production process. Moisture, water, salt water, and the like, can accumulate in these depressions, thus penetrating between the friction lining held on the plate and the brake lining carrier plate.

WO 00/49308 A1 discloses a brake lining carrier plate of the type being discussed herein in which holding structures are arranged in rows. Each holding structure has a protrusion that is arranged in the direction of the longitudinal axis of the brake lining carrier plate. As a result, it is not possible to adapt the holding structures on the brake lining carrier plate to the outer contour of the friction lining in such a manner as to avoid the edge lifting effect. Since a depression in the form of a groove or channel has to be worked in the brake lining carrier in order to produce the protrusions, for the rows running in the lengthwise direction, there is a depression at least at the beginning or end of each row. Moisture can accumulate in said depression between the lining carrier plate and the brake lining, thus causing an edge lifting effect. Moreover, through the alignment of the rows of the holding structures in the lengthwise direction, the crosswise edges of the brake lining, which are especially stressed during braking, are affected, so that the risk of the brake lining shearing off from the brake lining carrier plate is especially great.

U.S. Pat. No. 4,799,579 A1 describes brake lining carrier plates with holding structures having protuberances and depressions which are arranged in rows in the direction of the longitudinal axis of the brake lining carrier plate. As a result, there is also a risk of an edge lifting effect there since moisture can accumulate in the depressions arranged in the edge area of the brake lining.

It would be desirable to provide a brake lining carrier plate that avoids the risk of a detachment of the friction lining from the brake lining carrier plate, especially in the edge area of the brake lining.

SUMMARY OF THE INVENTION

According to one aspect of the invention, a brake lining carrier plate is provided wherein the holding structures in the rows are arranged in such a way that there is a protrusion at the beginning and at the end of each row. In this manner, the holding structures can be adapted to the outer contour of the friction lining without the rows beginning or ending with depressions. This counteracts an accumulation of moisture in front of the first protrusion at the beginning of the rows or behind the last protrusion at the end of the rows.

According to a first embodiment of the invention, the holding structures have at least two sections with an opposing arrangement of the protrusion and of the depression of the holding structures. As long as the opposing sections are arranged at the opposite ends of the rows, the manufacturing process can then easily fulfill the requirement that there should be a protrusion (or a crimp) at the beginning and at the end of each row. Moreover, as a result, the holding bond effectuated between the brake lining carrier plate and the friction lining by the holding structures can withstand greater stress. In this manner, the friction lining can absorb greater braking forces without the friction lining shearing off from the brake lining carrier plate.

If the free ends of the protrusions (or crimps) face forward or else, for example, face backward (like a burr), the friction lining can then also absorb greater forces that are exerted in a direction perpendicular to the surface of the friction lining, for example, when the brake is lifted.

In another embodiment of the invention, the rows of holding structures run essentially in the direction of the longitudinal axis of the brake lining carrier plate. Consequently, the rows are arranged in the same direction or in the opposite direction of the shear forces that are exerted on the brake lining carrier plate or friction lining during braking. Thanks to this measure, precisely at the especially highly stressed edges of the friction lining, which run crosswise, there is no depression at the beginning or at the end of a row, but rather always a protrusion. As a result, edge lifting effect is avoided. Hence, the friction lining is prevented from shearing off from the brake lining carrier plate in an especially effective manner.

As an alternative, the rows also can run essentially crosswise to the longitudinal axis of the brake lining carrier plate. The manufacturing process for such an arrangement is simple and allows an adaptation of the holding structures to each specific friction lining contour, even in the critical edge areas of the friction lining, without the rows beginning or ending with depressions. In particular, this achieves an arrangement of the holding structures on the brake lining carrier plate that ensures optimal holding conditions for the friction lining.

According to a further refinement, the position of the protrusion and of the depression of the holding structures alternates between adjacent rows. Insofar as the free ends of the protrusions point in one direction, that is to say, in the manufacturing direction of the holding structures of the appertaining row relative to the next holding structure or the previous holding structure, the protrusions of adjacent rows face each other. This is also capable of effectively counteracting so-called edge lifting since, on both edge areas of the friction lining into which the two ends of the rows extend next to a depression, there is always arranged a protrusion of the adjacent row.

An advantageous refinement is that, with holding structures of adjacent rows that are arranged in opposite directions—as seen in the manufacturing direction of the holding structures—the beginning of each row is offset with respect to the end of the appertaining adjacent row towards the middle of the brake lining carrier plate. In this manner, as seen in the manufacturing direction, there are no depressions, but rather only protrusions in the edge area of the friction lining.

It is advantageous for the holding structures of adjacent rows to be arranged so as to be offset with respect to each other, whereby preferably a protrusion of one row comes to lie in the area of the depressions of an appertaining adjacent row. This prevents the depressions of adjacent rows from coming to lie directly next to each other, thereby forming a continuous conduit for moisture, dirty water, salt water, and the like.

According to yet another embodiment of the invention, the rows are arranged in a fan formation in their lengthwise extension. In this way, especially the contour of the friction lining found in conventional disk brakes is taken into account. Here, the rows that are arranged in a fan formation run essentially in the crosswise direction or also approximately in the lengthwise direction of the brake lining carrier plate.

In the case of rows that run essentially in the crosswise direction of the brake lining carrier plate, it is advantageous for the rows—relative to the installation position of the brake lining carrier plate—to diverge outwards in the radial direction. This results in favorable holding conditions for the friction lining, especially in conventional disk brakes, since the holding structures are consequently less stressed during braking, thus diminishing the risk that the friction lining will shear off.

A further alternative embodiment of the invention provides that the brake lining carrier plate has at least two areas, each with rows of holding structures that run towards each other and that are aligned in a fan formation, whereby the holding structures of the one area are aligned counter to the holding structures of the other area. In this manner, the machining of the holding structures can be carried out in a way that is gentle on the brake lining carrier plate, because the forces that act on one area during the production of the holding structures and the forces that act on the other area largely cancel each other out. This is especially the case when the two areas are arranged mirror-symmetrically relative to the middle crosswise axis and/or relative to the middle longitudinal axis of the brake lining carrier plate.

It is advantageous for the rows of the two areas to diverge in opposite directions. In this manner, the manufacturing process can easily provide especially large brake lining carrier plates with the holding structures in that, in two consecutive work steps, first the holding structures of the one area can be made and then, after re-clamping the brake lining carrier plate into the device that is producing the protrusions, the rows of the second area can be produced.

The same approach may be taken with the alternative measure, namely, that the rows of the two areas diverge towards the middle of the brake lining carrier plate.

According to still another alternative measure, it can also be provided that the rows of the two areas diverge in the same direction. In this case, it is beneficial for the rows to have essentially the same center of convergence. This is especially advantageous if the rows of the two areas are produced simultaneously in a single work cycle since the tool that is needed to produce these rows can be manufactured easily. Here, it is advantageous for the two areas to overlap in the edge area of their sides facing each other in such a way that the ends of the rows of the one area lie between the ends of adjacent rows of the other area. In this manner, thanks to the large number of protrusions, a firm holding effect of the friction lining on the brake lining carrier plate is achieved precisely in the area that is particularly highly stressed during braking.

The production of the tool for machining the brake lining carrier plate is especially simple if the abutting holding structures of adjacent rows each lie on a radius.

It is also advantageous for the holding structures to be arranged at least in the edge area of the friction lining. After all, in order to avoid edge lifting, it is sufficient if the holding structures are present in the edge area of the friction lining. In this context, the inner surface of the brake lining carrier plate no longer has to be completely provided with holding structures as well. However, an arrangement of holding structures covering the entire surface additionally achieves a higher absorption of the braking forces.

It is advantageous for the protrusions to have a height h of about 1.40 mm to 1.80 mm, preferably about 1.60 mm, as measured from the surface of the brake lining carrier plate. In this range, an especially good bond of the friction lining to the brake lining carrier plate is achieved and edge lifting can be counteracted.

The same approach is taken by the measure in which the protrusions are aligned at an angle $\alpha$ of approximately 80° to 84° relative to the surface of the brake lining carrier plate, preferably in the direction of each associated depression.

It is advantageous for the brake lining carrier plate either to be curved or to be essentially flat in shape. As a result, the brake lining carrier plate can be used not only in a disk brake system, but also in a drum brake system.

Additional objectives, advantages, features and application possibilities of the present invention can be gleaned from the description below of several embodiments, making reference to the drawings. Here, all of the described and/or depicted features constitute the subject matter of the present invention either on their own or in any appropriate combination, also irrespective of their compilation in the claims or the way in which they refer back to the main claim.

DESCRIPTION OF THE DRAWINGS

FIG. 2 is a top plan view of the brake lining carrier plate according to FIG. 1;

FIG. 3 is a side elevational view of the brake lining carrier plate according to FIG. 1;

FIG. 4 is a cross-sectional view of the brake lining carrier plate according to FIG. 1 taken along the section line A-A according to FIG. 2;

FIG. 5 is an exploded cross-sectional view of the holding structure of the brake lining carrier plate according to FIG. 1 as a depiction of detail B according to FIG. 4;

FIG. 9 is a top plan view of the brake lining carrier plate according to FIG. 8;

FIG. 10 is a cross-sectional view in side elevation taken along the section line A-A according to FIG. 9;

FIG. 11 is an exploded cross-sectional view of the holding structure of the brake lining carrier plate according to FIG. 8 as a depiction of detail B according to FIG. 10;

FIG. 15 is a top plan view of another embodiment of a brake lining carrier plate according to the invention;

DETAILED DESCRIPTION

Figure 1:
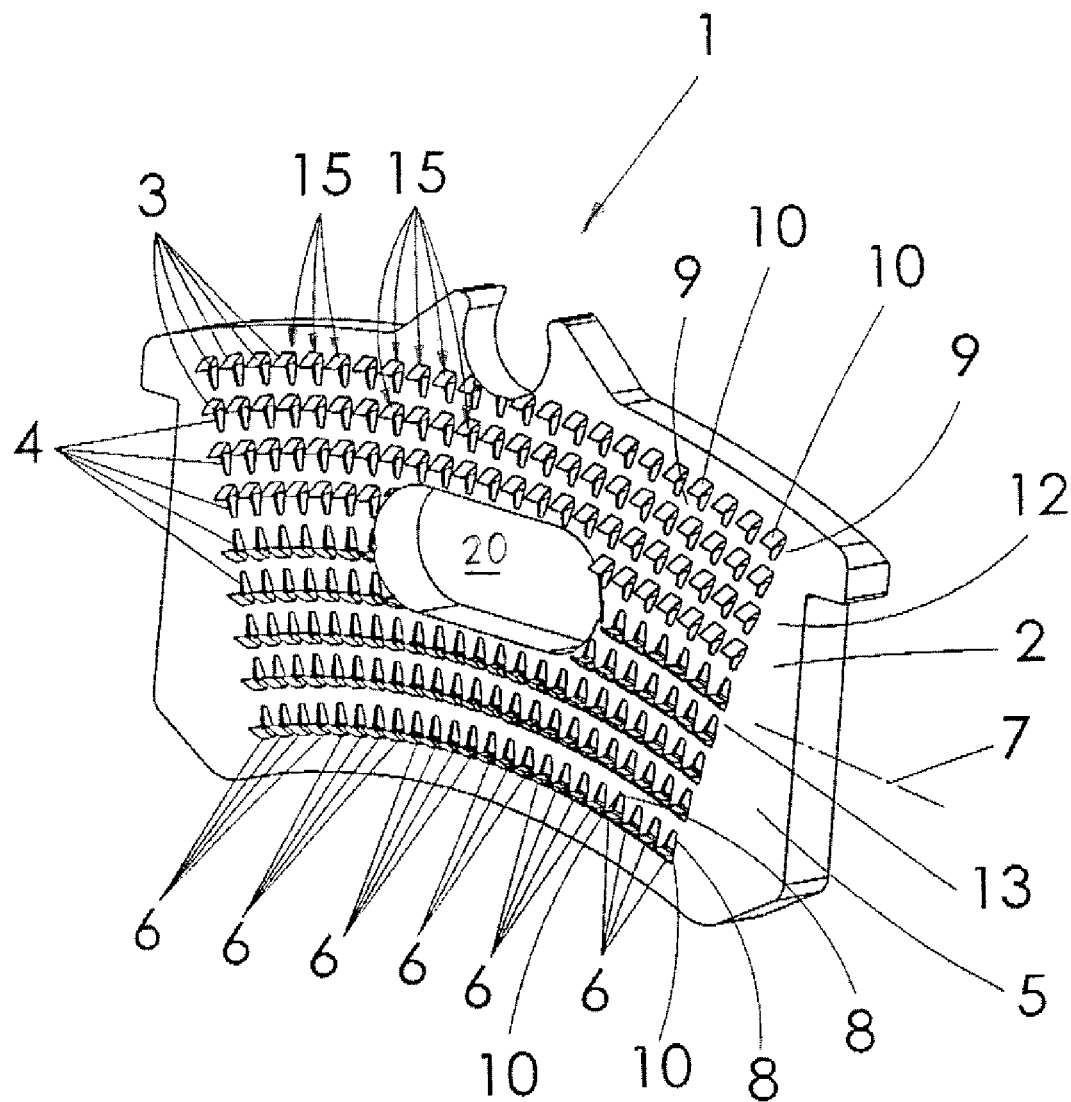
FIG. 1 is a perspective view of a possible embodiment of a brake lining carrier plate according to the invention to hold a friction lining.

FIGS. 1 to 4 show a brake lining carrier plate 1 to hold a friction lining of the type used, for example, in a vehicle brake system. Such a brake system can be, for instance, a disk brake. As a matter of principle, the brake lining carrier plate 1 can also be employed in a drum brake or in another type of brake system.

The brake lining carrier plate 1 has holding structures 15 arranged in rows 6 on the lining side 2 for the friction lining (not shown here). Each holding structure 15 has a protrusion 3 and a depression 4, whereby the protrusion 3 is made in the carrier plate surface 5 through the displacement of material, thereby forming the depression 4. To form the brake structure, said protrusion 3 engages with the friction lining (not shown here).

The rows 6 run essentially crosswise to the longitudinal axis 7 of the brake lining carrier plate 1, and are arranged in a fan formation, namely, in such a way that the rows 6—relative to the installation position of the brake lining carrier plate—diverge outwardly in the radial direction in the brake system. In such fan formation, the angle of adjacent rows of the holding structures is between about 0° to about 15°. Moreover, the abutting holding structures 15 of adjacent rows 6 each lie on a radius 11 (shown in FIG. 2).

In this embodiment (FIGS. 1 and 2), the holding structures 15 are arranged in the rows 6 in such a way that there is a protrusion 10 at the beginning 8 and at the end 9 of each row 6. The rows 6 also have two sections 12, 13 in which the positions of the protrusion 3 and of the depression 4 of the holding structures 15 are opposing or alternating. Furthermore, the individual rows 6 with the holding structures 15 are arranged in such a way that they are adjacent to the edge of the friction lining (not shown here).

According to an embodiment (not shown here), it is, of course, also possible for the holding structures 15 to be arranged only in the edge area of the friction lining. As shown particularly in FIGS. 1 and 2, the holding structures 15 cover substantially the carrier plate surface, including portions of such surface adjacent to oval opening 20.

In the embodiment according to FIGS. 1-5, the protrusions are configured as crimps 3, whereby the free ends of the crimps are bent back, for example, facing each associated depression 4. As can be seen from FIG. 5, the crimps or protrusions 3 can have a height h of about 1.4 mm to 1.8 mm, preferably approximately 1.6 mm, and can be at an angle α towards each associated depression 4 of approximately 80° to 84° relative to the surface 5 of the brake lining carrier plate 1. Of course, the protrusions 3 can also have other heights, and can be configured in another manner, for example, in the form of pins, teeth, burrs, and the like.

Figure 6:
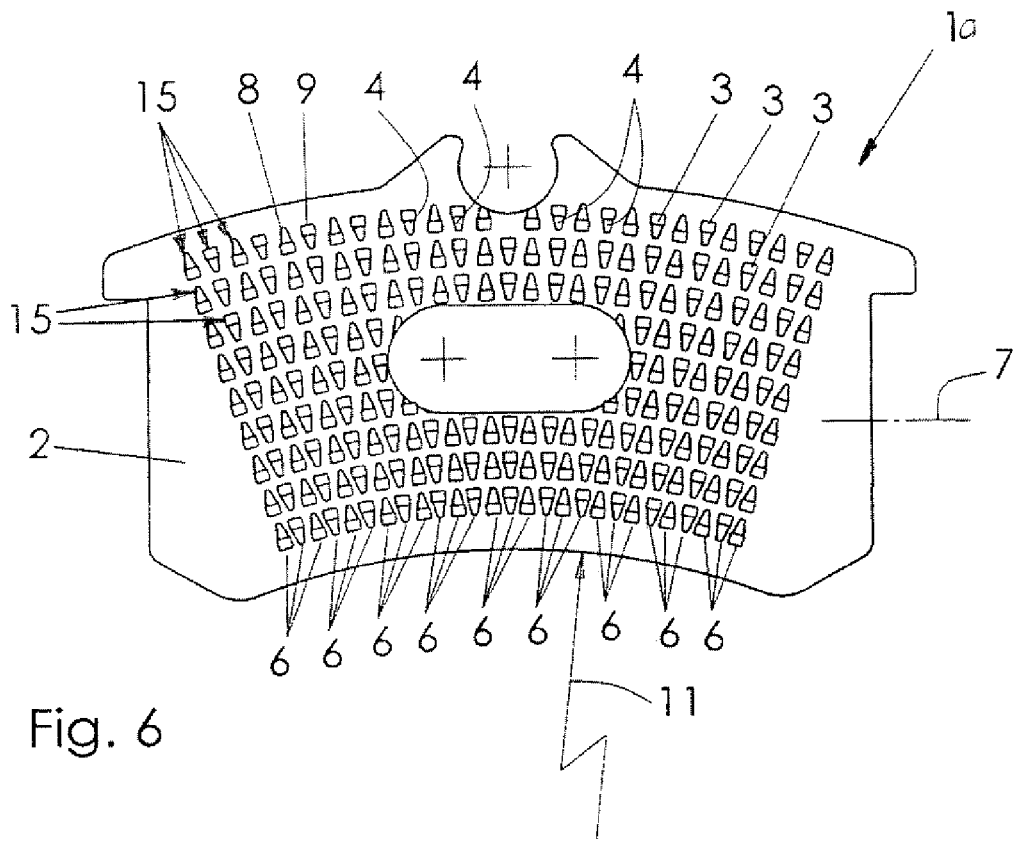
FIG. 6 is a top plan view of another embodiment of a brake lining carrier plate according to the invention.

FIG. 6 shows another embodiment of the brake lining carrier plate 1a. It differs from the embodiment according to FIG. 1, among other things, in that the position of each protrusion 3 and of each depression 4 of the holding structures 15 alternates between adjacent rows 6. As a result, the rows 6, which begin with a depression 4 due to production-related reasons, are each adjacent to a protrusion 3 in the edge area of the friction lining at the end of the appertaining adjacent row—as seen in the manufacturing direction of the holding structures 15. Consequently, depressions 4 and protrusions 3 alternate at the beginning and at the end of the rows 6.

Figure 7:
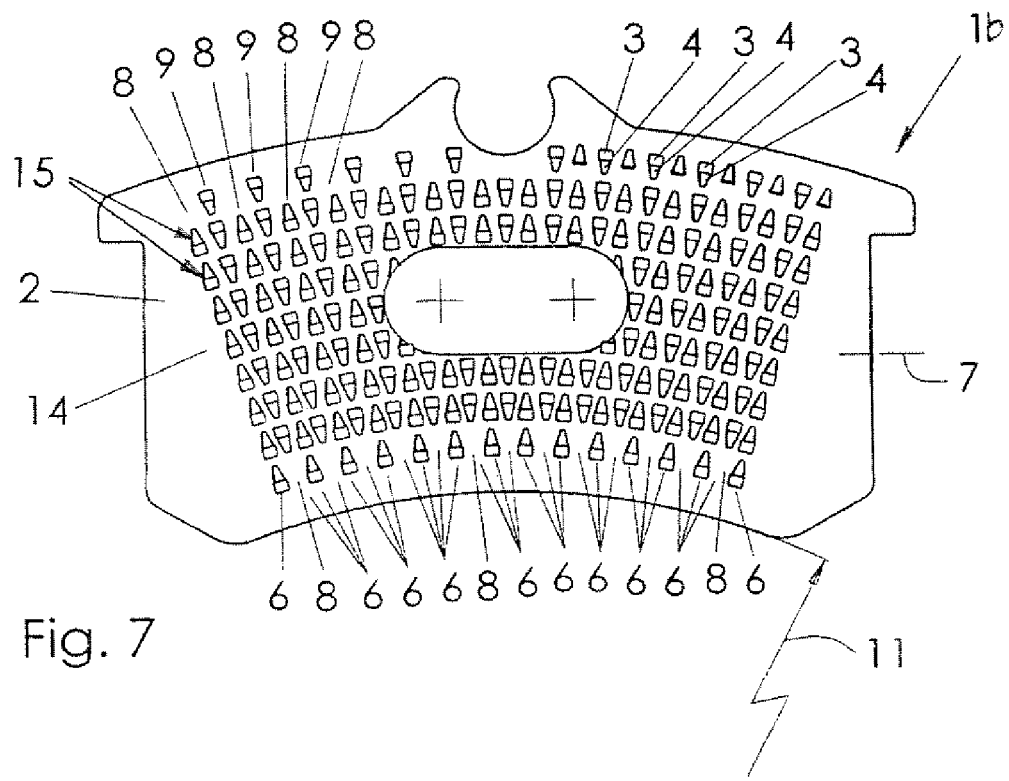
FIG. 7 is a top plan view of a refinement of the brake lining carrier plate according to FIG. 6.
Figure 8:
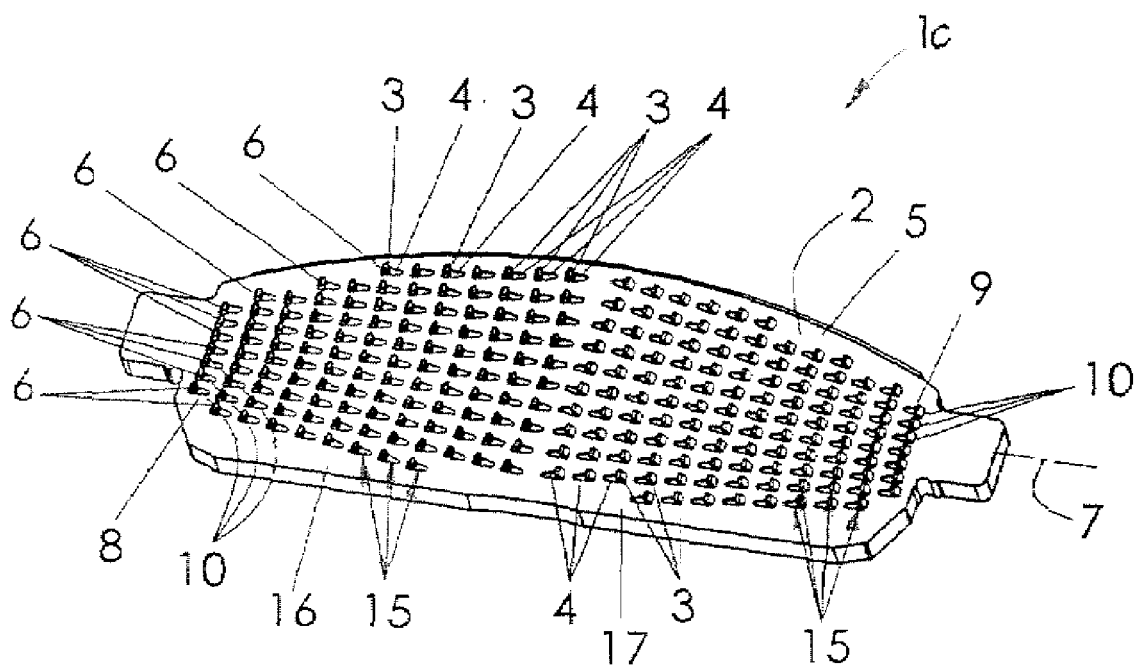
FIG. 8 is a perspective view of yet another embodiment of a brake lining carrier plate according to the invention.

A refinement of the embodiment of the brake lining carrier plate 1a according to FIG. 6 is shown in FIG. 7. The brake lining carrier plate 1b shown in FIG. 7 differs, among other things, from the embodiment according to FIG. 6 in that—as seen in the manufacturing direction of the holding structures 15—the beginning 8 of each row 6 is offset relative to the end 9 of the appertaining adjacent row 6 towards the middle portion 14 of the brake lining carrier plate 1b.

According to another embodiment (not shown here), it is also possible for the holding structures 15 of adjacent rows 6 to be arranged offset with respect to each other, so that a protrusion 3 of the respective adjacent row 6 is in line with the area of a respective depression in a first row.

FIGS. 8 to 11, in turn, show another embodiment of the brake lining carrier plate 1c. Elements of the brake lining carrier plate 1c that are the same as those of the previously explained embodiments of the brake lining carrier plate 1, 1a, 1b are designated with the same reference numerals. In this context, reference is hereby made to the description relating to the preceding embodiments. The embodiment according to FIGS. 8 to 11 differs from the preceding embodiments according to FIGS. 1, 6 and 7, among other things, in that the rows 6 run essentially in the direction of the longitudinal axis 7 of the brake lining carrier plate 1c in a fan formation. Here, the brake lining carrier plate 1c is divided into two areas 16, 17, each with rows 6 arranged in a fan formation and having holding structures 15, whereby the two areas 16 and 17 have an opposing arrangement of the protrusion 3 and of the depression 4 of the holding structures 15. In such fan formation, the angle between adjacent rows of the holding structures may be between about 0° and about 15°. Unlike in the embodiment of the brake lining carrier plate 1 according to FIG. 1, the rows 6 of the two areas 16, 17 diverge in this embodiment towards the middle 14 of the brake lining carrier plate 1c.

Figure 14:
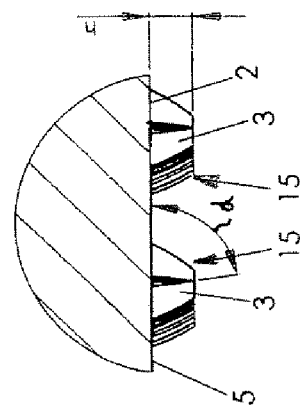
FIG. 14 is an exploded cross-sectional view of the holding structure of the brake lining carrier plate according to FIG. 12 as a depiction of detail B according to FIG. 13.
Figure 12:
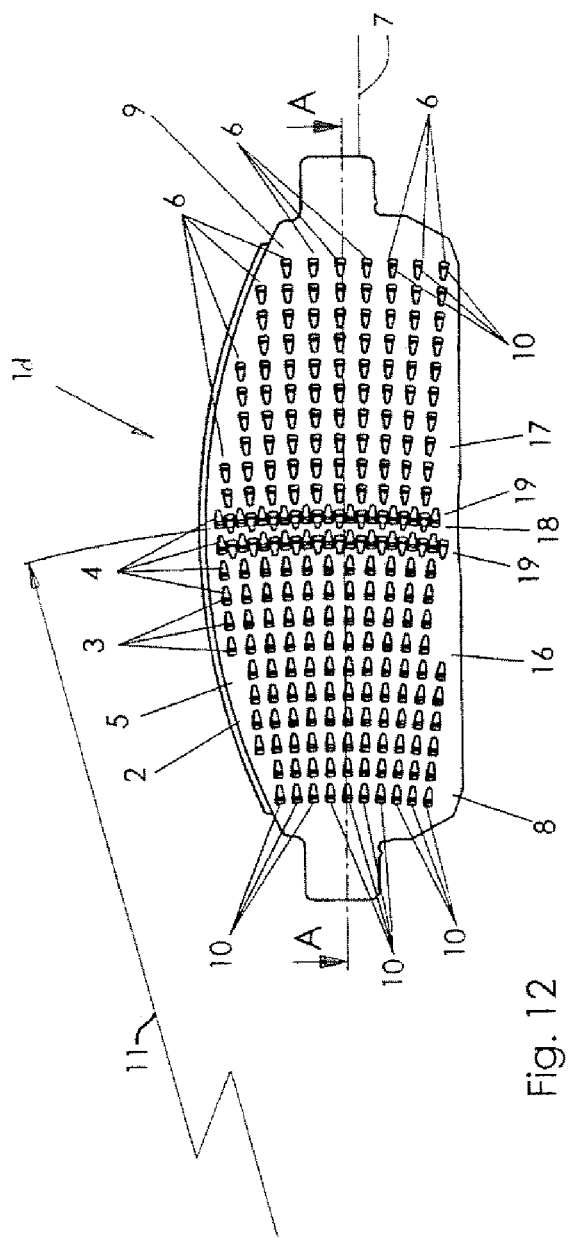
FIG. 12 is a top plan view of a still further embodiment of a brake lining carrier plate according to the invention.
Figure 13:
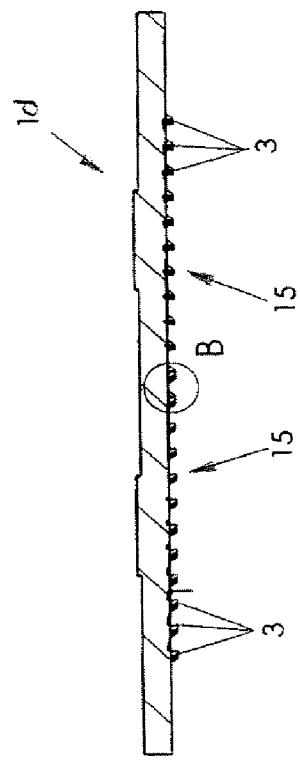
FIG. 13 is a cross-sectional view in side elevation taken along the section line A-A according to FIG. 12.

FIGS. 12 to 14 show a refinement 1d of the embodiment of the brake lining carrier plate 1c according to FIGS. 8 to 11. The same elements are once again designated with the same reference numerals; in this context, reference is made to the explanations pertaining to FIGS. 8 to 11. The embodiment 1d according to FIGS. 12 to 14 differs from the embodiment 1c according to FIGS. 8 to 11 in that the rows 6 of the two areas 16, 17 diverge in the same direction, whereby they have essentially the same center of convergence. Moreover, the two areas 16, 17 overlap in the edge area 18 of their sides 19 facing each other in such a way that the ends of the rows 6 of the one area 17 lie between the ends of adjacent rows 6 of the other area 16. For example, the overlapping in the edge area 19 can comprise two holding structures 15 of the rows 6 of the areas 16, 17. It is also possible for fewer or more structures 15 of the areas 16, 17 to overlap.

FIG. 15 shows yet another embodiment of the brake lining carrier plate 1e. Elements of the brake lining carrier plate 1e that are the same as those of the previously explained embodiments of the brake lining carrier plate 1c, 1d are designated with the same reference numerals. In this context, reference is hereby made to the description relating to the preceding embodiments. In FIG. 15, the brake lining carrier plate 1e is divided into two areas 16, 17, each with rows 6 arranged in a fan formation with respect to longitudinal axis 7. The rows 6 have holding structures 15, whereby the two areas 16 and 17 have a complementary arrangement of the protrusion 3 and of the depression 4 of the holding structures 15. Unlike in the embodiments of the brake lining carrier plate 1c according to FIGS. 8-11, the rows 6 of the area 17 diverge away from the middle 18 of the brake lining carrier plate 1e, such that the holding structures 15 are spaced more closely adjacent at the middle 18 than at the peripheral edge of the brake lining carrier plate 1e. In contrast, the rows 6 of the area 16 converge toward the opposite peripheral edge of the brake lining carrier plate 1e, such that the holding structures 15 are spaced more closely adjacent at the peripheral edge than at the middle 18 of the brake lining carrier plate 1e. The rows of areas 16 and 17 begin at the middle 18 with depressions 4. One holding structure 15 at the beginning of each row 6 of area 17 is adjacent to and overlaps with one holding structure 15 at the beginning of each row of area 16 at the middle 18 of the brake lining carrier plate 1e. Each row 6 begins with a depression 4 at the middle 18 and terminates with a protrusion 10 at the peripheral edge of the brake lining carrier plate 1e. However, the rows 6 of area 17 have a fan formation that diverges away from the middle 18, and the rows 6 of area 16 have a fan formation that converges toward the peripheral edge of the brake lining carrier plate 1e. In such fan formation, the angle between of adjacent rows of holding structures is between about 0° and about 15°. A holding structure 15 contour zone 22 is shown in phantom outline about the border of the brake lining carrier plate 1e.

Figure 16:
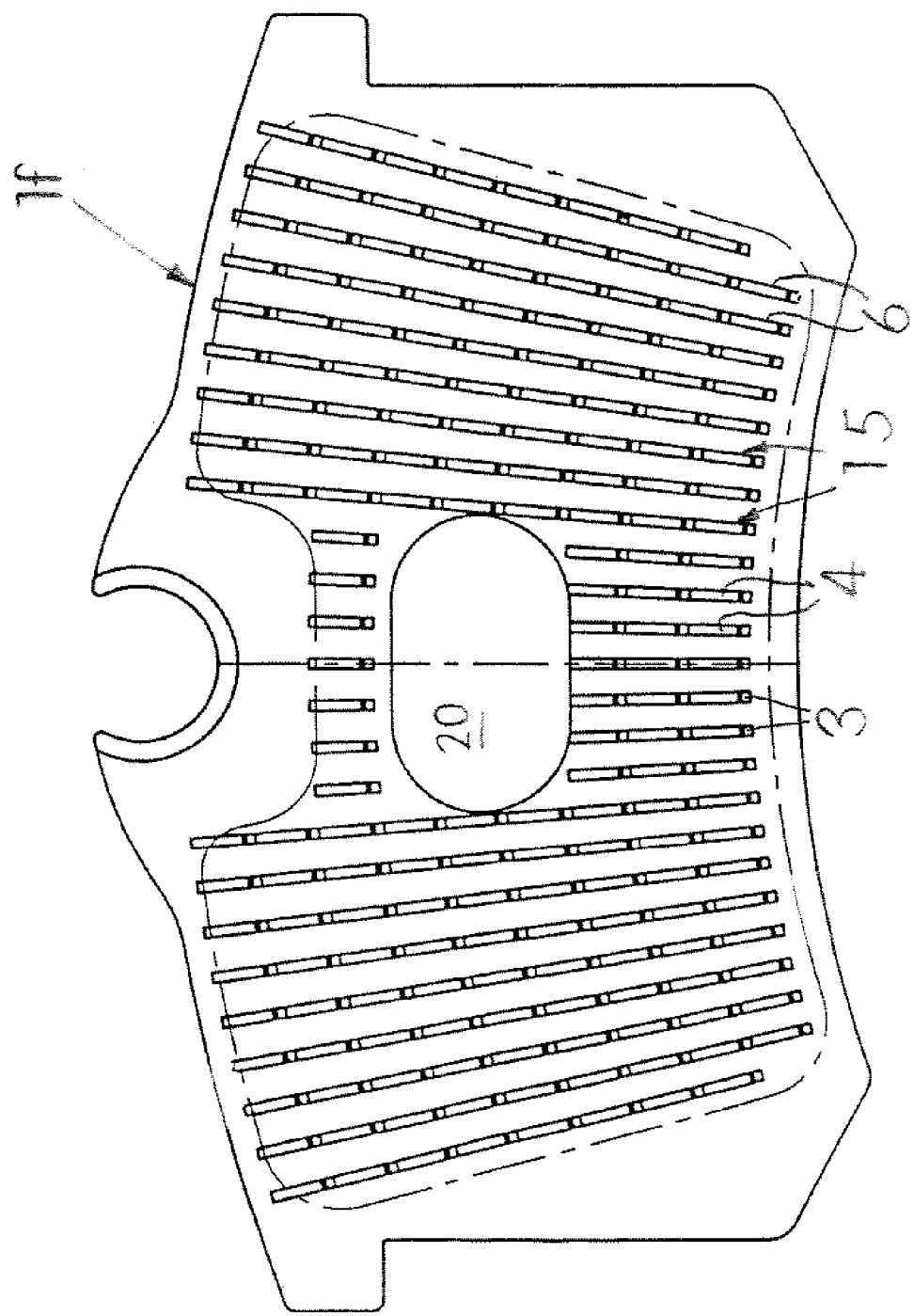
FIG. 16 is a top plan view of a further alternate embodiment of a brake lining carrier plate according to the invention.

As a further alternative to the brake lining carrier plates 1, 1a and 1b shown in FIGS. 1-7, there is shown in FIG. 16 an embodiment of the brake lining carrier plate 1f in which the rows 6 of holding structures 15 run essentially crosswise to the longitudinal axis 7 of the brake lining carrier plate 1f and are arranged in a fan formation. In contrast to the brake lining carrier plates 1, 1a and 1b, in this embodiment 1f the rows 6 of holding structures 15 are formed in one cutting direction without alternating the positions of the protrusions 3 and depressions 4 between adjacent rows. Nor do the positions of the protrusions 3 and depressions 4 alternate above and below oval opening 20.

Figure 17:
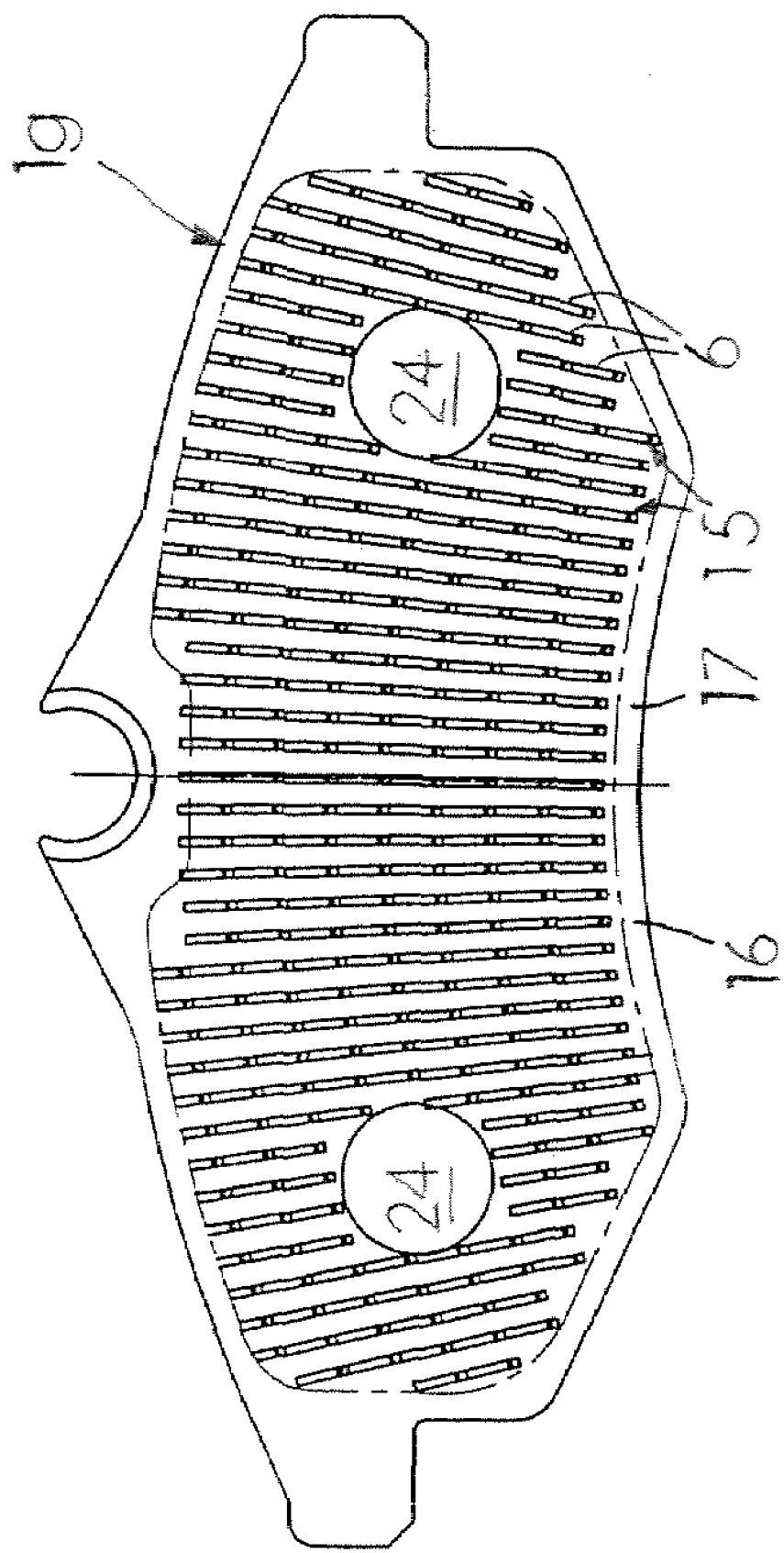
FIG. 17 is a top plan view of still another alternate embodiment of a brake lining carrier plate according to the invention that has a different outer peripheral contour.

FIG. 17 shows another brake lining carrier plate 1g with rows 6 of holding structures 15 formed in a manner similar to that of the brake lining carrier plate 1f shown in FIG. 16. In FIG. 17, the outer periphery of the brake lining carrier plate has a configuration adapted for installation into a different vehicle. Circular openings 24 are formed in areas 16 and 17 in the brake lining carrier plate.

Figure 18:
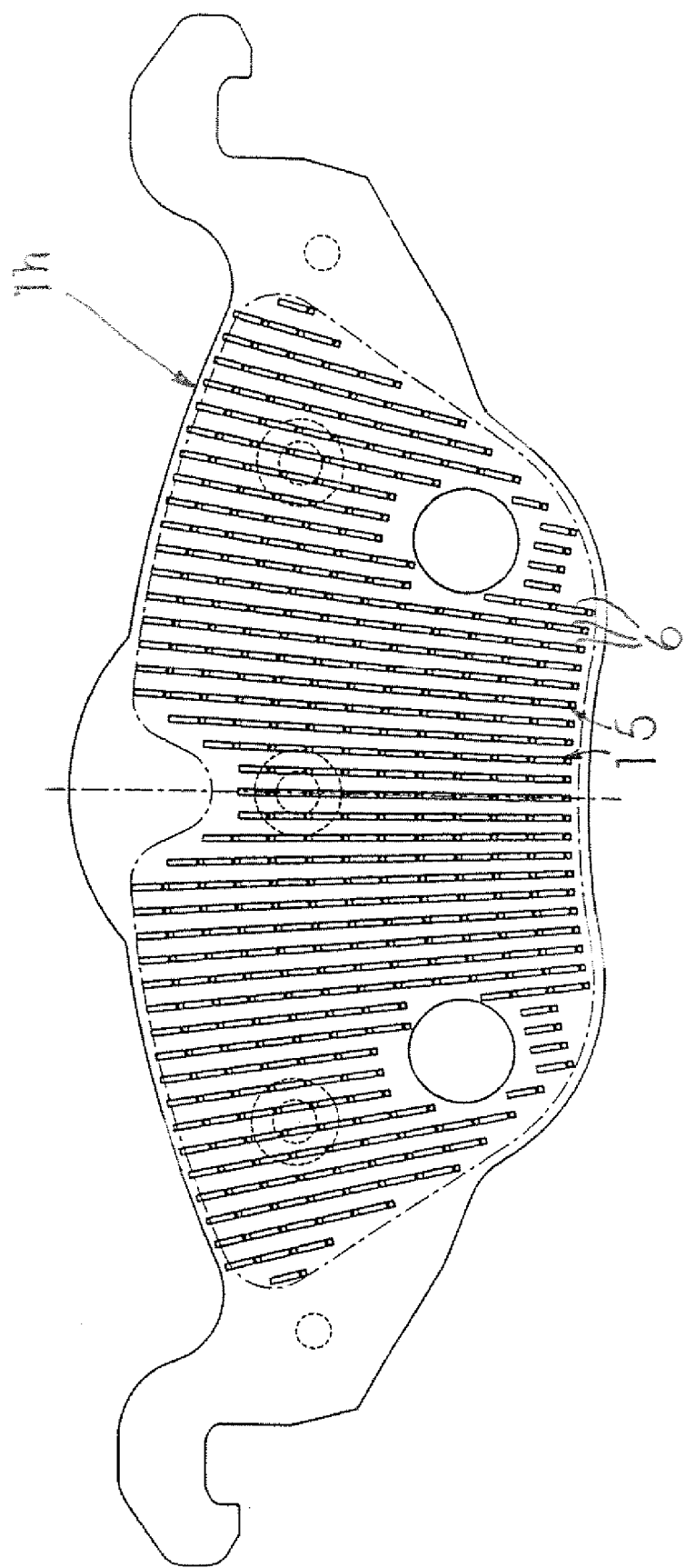
FIG. 18 is a top plan view of yet another alternate embodiment of a brake lining carrier plate according to the invention that has yet another different outer plate periphery.

FIG. 18 illustrates yet another alternative brake lining carrier plate 1h according to the invention with rows 6 of holding structures 15 formed in a manner similar to that of brake lining carrier plate 1f shown in FIG. 16. In FIG. 18, the outer periphery of the brake lining carrier plate has a configuration adapted for installation into still a different vehicle.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed as new and desired to be protected by Letters Patent of the United States is:

1. A brake lining carrier plate to hold a friction lining, comprising: a brake lining carrier plate having a lining side defining a surface to which the friction lining is joinable, where said surface has a peripheral edge; and
holding structures for the friction lining arranged in two or more linear rows on the lining side of the brake lining carrier plate, wherein each holding structure has a depression formed in the surface and a protrusion formed of at least a portion of material displaced from the surface when the depression is formed, which formation defines the direction and width of a respective linear row of holding structures, and wherein the protrusion and the depression of each holding structure lie one behind the other in the direction of the respective linear row and on a straight axis of said respective linear row, said protrusions engageable with the friction lining, and wherein the holding structures are arranged so that at least two holding structures are formed in a direction opposing at least two other holding structures in each respective linear row, and there is a protrusion at the beginning of each row, and a protrusion at the end of each row, and no row begins or terminates with a depression, so that protrusions at the beginning and end of each respective linear row are disposed adjacent to the peripheral edge and arranged so as to abut one or more edges of the friction lining when said lining is engaged to the brake lining carrier plate.

2. The brake lining carrier plate according to claim 1, wherein the brake lining carrier plate has a length and a width with the length longer than said width and defines a longitudinal axis extending along its length, and each axis of the rows of holding structures runs essentially crosswise to said longitudinal axis.

3. The brake lining carrier plate according to claim 1, wherein the rows are aligned with said axes of said rows in a fan formation in their lengthwise extension.

4. The brake lining carrier plate according to claim 1, wherein the protrusions have a height (h) of from about 1.4 mm to 1.8 mm relative to the surface of the brake lining carrier plate.

5. The brake lining carrier plate according to claim 1, wherein the protrusions are aligned at an angle ($\alpha$) of approximately 80° to 84° relative to the surface of the brake lining carrier plate in the direction of each associated depression.

6. The brake lining carrier plate according to claim 1, wherein the lining side of the brake lining carrier plate has a contour selected from the group consisting of curved and substantially flat.

7. The brake lining carrier plate according to claim 1, wherein each row of holding structures has a first holding structure, and the first holding structures of adjacent rows each lie in a common arc with the same or essentially the same radius.

8. A brake lining carrier plate to hold a friction lining, especially for installation into a vehicle brake system, comprising:
a brake lining carrier plate having a lining side to which the friction lining is joinable, said lining side defining a surface having a length and a width and peripheral edges at two opposing ends of the lining side, said carrier plate further defining a longitudinal axis extending along the length of the lining side; and
holding structures for the friction lining arranged in four or more linear rows on the lining side, such that each holding structure has a depression and a protrusion, with the protrusion engageable with the friction lining, wherein the protrusions are made in the direction of a respective row when the depressions are formed in the surface through the displacement of material with the protrusion and the depression of each holding structure lying one behind the other in the direction of the respective row and defining a straight axis of said row, and a protrusion of each holding structure not at a peripheral edge is adjacent to a depression of an adjacent holding structure in each row, and each row terminates at one end with a projection disposed adjacent to one of the peripheral edges and at the other end with a depression disposed non-adjacent the other peripheral edge, and wherein the axes of two or more rows are aligned in a first fan formation in their lengthwise extension, and the axes of two or more other rows are aligned in a second fan formation in their lengthwise extension, and the holding structures are arranged so as to abut one or more edges of the friction lining when said lining is engaged to the brake lining carrier plate.

9. The brake lining carrier plate according to claim 8, wherein the position of each protrusion and each depression of the holding structures alternates between adjacent rows of holding structures.

10. The brake lining carrier plate according to claim 8 or claim 9, wherein the holding structures are arranged in rows formed in opposite directions, and a beginning of a first row is offset with respect to an end of an appertaining adjacent row towards a middle region of the surface of the brake lining carrier plate.

11. The brake lining carrier plate according to claim 8 or claim 9, wherein the holding structures are arranged in rows wherein adjacent rows are offset with respect to each other, and wherein the area of the depression of a row is in line with a respective protrusion of the respective adjacent row.

12. The brake lining carrier plate according to claim 8, characterized by at least two areas of the surface of the brake lining carrier plate each having rows of holding structures that run towards each other, and wherein the holding structures of the first area are aligned with depressions and protrusions formed in a direction opposite to the formation of the depressions and protrusions of the holding structures of the second area.

13. The brake lining carrier plate according to claim 12, wherein the rows of the at least two areas diverge in opposite directions.

14. The brake lining carrier plate according to claim 12, wherein the rows of the at least two areas diverge in the same direction.

15. The brake lining carrier plate according to claim 14, characterized in that, with rows of the two areas that diverge in the same direction, the rows have essentially the same center of convergence.

16. The brake lining carrier plate according to claim 12, wherein the rows of the two areas diverge towards a middle portion of the brake lining carrier plate.

17. The brake lining carrier plate according to claim 16, wherein the two areas overlap in an edge area of their sides facing each other in such a way that the ends of the rows of the one area lie between the ends of adjacent rows of the other area.

18. The brake lining carrier plate according to claim 12, characterized in that the at least two areas are arranged mirror-symmetrically relative to a middle crosswise axis of the brake lining carrier plate.

19. The brake lining carrier plate according to claim 12, characterized in that the at least two areas are arranged mirror-symmetrically relative to the longitudinal axis of the brake lining carrier plate.

20. The brake lining carrier plate according to claim 8, characterized in that the rows diverge outwards in the radial direction.

21. The brake lining carrier plate according to claim 8, wherein abutting holding structures of adjacent rows each lie in a common arc with the same or essentially the same radius.

22. The brake lining carrier plate according to claim 8, wherein the protrusions have a height (h) of about 1.4 mm to 1.8 mm.

23. The brake lining carrier plate according to claim 8, wherein the protrusions are aligned at an angle ($\alpha$) of approximately 80° to 84° relative to the surface of the brake lining carrier plate, and in the direction of an associated depression.

24. The brake lining carrier plate according to claim 8, wherein the lining side of the brake lining carrier plate has a contour selected from the group consisting of curved and substantially flat.

25. The brake lining carrier plate according to claim 8, wherein the lining side of the brake lining carrier plate has a substantially flat contour.

* * * * *